Oct. 6, 1964  V. F. ZAHODIAKIN  3,151,652
FASTENING DEVICES
Filed Feb. 26, 1958  3 Sheets-Sheet 1

INVENTOR.
Victor F. Zahodiakin
BY
Howard P. King
ATTORNEY

Oct. 6, 1964  V. F. ZAHODIAKIN  3,151,652
FASTENING DEVICES
Filed Feb. 26, 1958  3 Sheets-Sheet 2
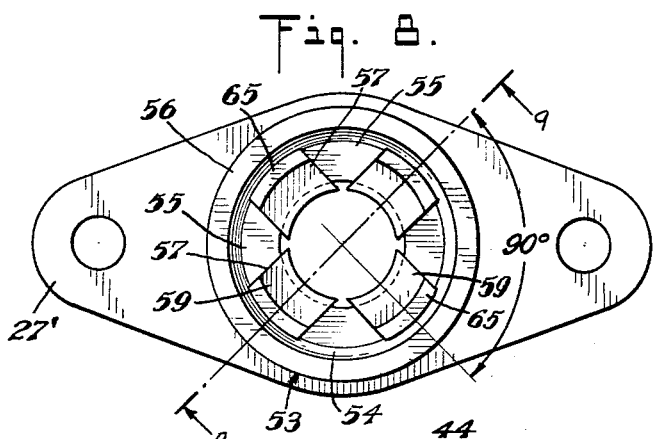
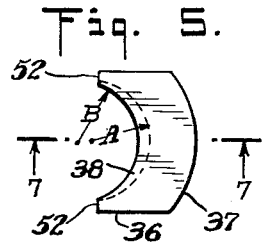
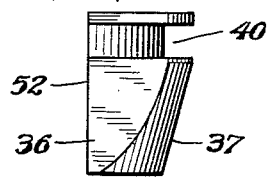
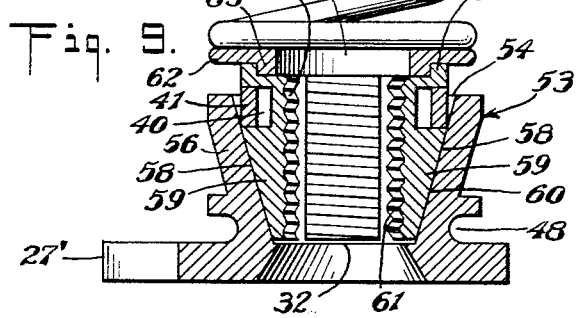
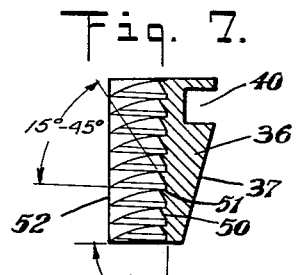
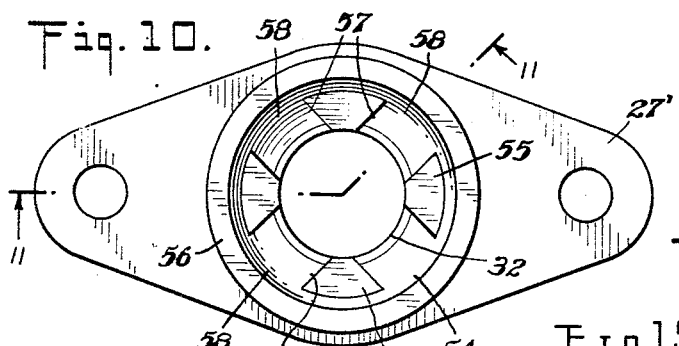
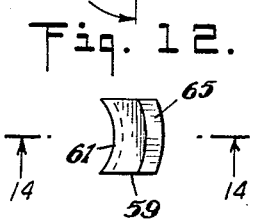
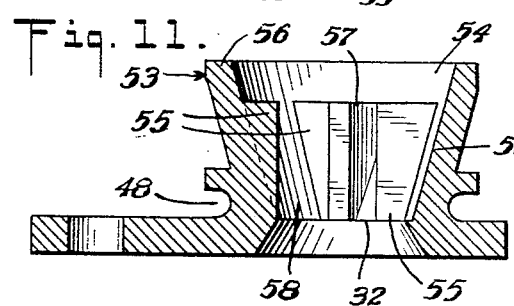
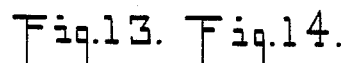
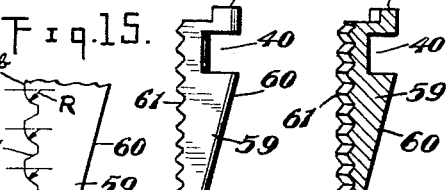
INVENTOR.
Victor F. Zahodiakin
BY
Howard P. King
ATTORNEY Oct. 6, 1964         V. F. ZAHODIAKIN         3,151,652
                     FASTENING DEVICES
Filed Feb. 26, 1958                          3 Sheets-Sheet 3

INVENTOR.
VICTOR F. ZAHODIAKIN
BY Howard P. King
ATTORNEY.

United States Patent Office 3,151,652
Patented Oct. 6, 1964

3,151,652
FASTENING DEVICES
Victor F. Zahodiakin, P.O. Box 689, Summit, N.J.
Filed Feb. 26, 1958, Ser. No. 717,715
9 Claims. (Cl. 151—19)

This invention relates to fastening devices such as adapted for use in fastening together superposed panels or other members or assemblies. Quickly operable devices of this general character have extensive uses in industry, as for use with aircraft as well as a variety of other applications, for securing in place various members, such as plates, brackets, doors and panels, among numerous other parts and things. The invention has particular reference to fastening devices of the so-called rotary type, that is, of a type adapted to be secured in place by pressing on the head of the stud to slide it inwardly, and/or by relative rotation of the stud in its socket.

In its general aspect, the invention contemplates an improved fastening device of quick-locking push-rotary type as above defined, which will lock tightly in place and remain securely in place under all conditions of use.

A more specific object of the invention is to provide a push-rotary type fastening device in which longitudinal displacement between threaded jaws within a receptacle is obtained by means of a threaded bolt or stud engaging within said threaded jaws and generating a great radial force between the jaws and receptacle which is transmitted to the bolt or stud and thereby provides positive locking engagement.

Another object of the invention is to provide a push-rotary type quick locking fastening device with a plurality of threaded jaws which tend to contract toward the axis to generate a constant prevailing torque on the threaded stud and thereby prevent the stud from disengaging from the device regardless of adverse conditions, such as when the stud is not fully screwed home.

It is another object of the invention to provide a push-rotary type fastening device which has a tubular receptacle the interior cavity or bore of which is provided with diametrically located channels of segmental frusto-conical character and having jaws in said channels with the outward or external faces of said jaws having correspondingly identical segmental frusto-conical configuration thereto for cooperation with the receptacle, and wherein said jaws are constantly urged radially inwardly to generate prevailing torque.

Also specifically, another object of the invention is to provide inter-engaging working surfaces of segmental frusto-conical type on the exterior of the threaded jaws and interior of the receptacle as walls of said channels, by which a radial gripping force is generated initially by an axially positioned coil spring and later a maximum axial force is generated by operation of pushing and/or screwing the stud home, and to thereby also simultaneously generate a maximum radial gripping force on the stud.

A further important object of the invention is that the configuration and the construction of the receptacle and threaded jaws are such that the same may be manufactured by use of pressure formation methods such as by a powdered metal process or by coining operations, or other analogous methods, whereby precision component parts will be produced at extremely low cost.

Another object and advantage of the invention is that the receptacle of the device can be molded from a suitable plastic, such as a polyamide of which one identified by the trademark "Nylon" is an example, and thereby have the advantage of extremely light weight and sufficient strength for commercial applications at a low cost.

Of like character to the foregoing object, is the provision of a structure applicable for use with low stresses and low temperatures, wherein the receptacle and jaws may be made from a high strength polyamide, such as the above-mentioned "Nylon" or from other type of similar plastic, and wherein the stud may be made of aluminum, whereby the entire device will be extremely light in weight and of extremely low cost.

Another object of the invention is to shape the internal minor diameter of the threads of the jaws in such a way that the threaded jaws at their facing edges will not damage the stud, regardless of the hardness of the jaws, when the stud threads are slid across the threads of the jaws in the manner of a ratchet.

In greater detail, the invention proposes a quick acting stud and nut assembly of fastening device employing a threaded stud and nut, comprising a tubular shell or receptacle containing a pair or plurality of threaded jaws, the interior of the receptacle being provided with a corresponding pair or plurality of channels of generally frusto-conical segmental character as part of the interior surface of said receptacle which engage corresponding surfaces of the threaded jaws also of generally frusto-conical segmental character at their outward surfaces, said jaws being interiorly specially threaded for engagement with like threads of the stud, and wherein spring means is provided for acting in a direction axially of the receptacle and against ends of the jaws for forcing the jaws to a specific restricted pitch diameter and thereby provide prevailing torque when the stud is engaged in the interior of the threaded jaws.

Yet another object of the invention is to provide a fastening device which generates the prevailing torque on the stud by means of a spring and yet in case of failure of the spring effectiveness, the device will not be depreciated in its positive locking ability when the stud is screwed home, nor will normal operation of the device be impaired, with exception that prevailing torque will not be effective.

Another and important object of the invention is to provide a stud and socket fastening device in which engagement of the stud with its nut is accomplished not only by screwing the stud into the nut but may be accomplished by simply pressing the head of the stud in axial direction to cause the stud threads to slide over the threads of the nut jaws in the nature of a ratchet and then by twisting the stud clockwise positively locking the entire assembly.

A still further object of the invention is to provide a locking device which, even though subjected to extremely high temperature sufficient to destroy the resiliency of its spring, the device will continue unimpaired in maintaining its positive locking force on the stud by virtue of positive locking of the stud being effected by radial force generated by axial force applied by screw operation of the stud.

Other objects, advantages and novle features of construction will become apparent to persons skilled in the art to which the invention appertains as the description proceeds, both by direct recitation thereof and by implication from the context.

Referring to the accompanying drawings, in which like numerals of reference indicate similar parts throughout the several views;

FIGURE 1 is a plan of the fastening device of the present invention showing the same in position on members being clamped thereby;

FIGURES 2 and 3 are vertical sectional views taken on lines 2—2 and 3—3 respectively of FIG. 1;

FIGURE 5 is a plan of one of the threaded jaws;

FIGURE 6 is an elevational view of said jaw looking at what may, for convenience, be called the front thereof;

FIGURE 7 is a vertical section of the jaw on line 7—7 of FIG. 5;

FIGURE 8 is a plan of a modified construction of receptacle and showing jaws in position therein;

FIGURE 9 is a sectional view on line 9—9 of FIG. 8 and in addition showing a special form of pressure-distributing washer seated on the jaws and a spring thereabove;

FIGURE 10 is a plan of the modified construction of receptacle of FIGS. 8 and 9;

FIGURE 11 is a vertical sectional view of the receptacle taken on line 11—11 of FIG. 10;

FIGURE 12 is a plan of one of the threaded jaws of said modified construction;

FIGURE 13 is an elevational view of said jaw;

FIGURE 14 is a vertical section of said jaw taken on line 14—14 of FIG. 12; and

FIGURE 15 is an enlarged elevation of a portion of the jaw showing the thread formation in detail.

Figure 1:
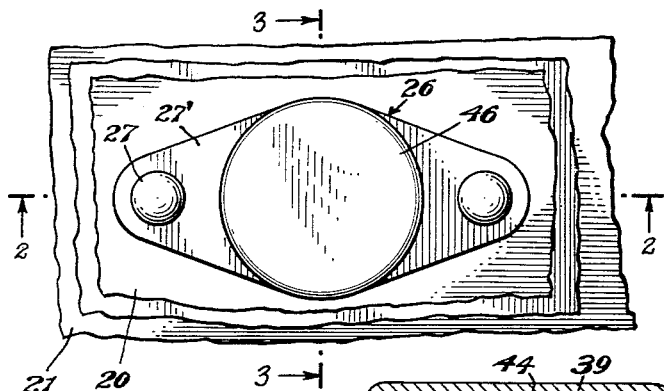

There have been many attempts to create fastening devices of the above-mentioned rotary type, but such attempts have involved numerous difficulties. For example, some of such devices involve the use of intricate parts which easily become ineffective in operation or cannot withstand elevated temperatures, besides involving expensive manufacturing processes. Another difficulty with such devices as are generally available heretofore, resides in the fact that they are made to accommodate substantially only one preselected thicknesses of members to be fastened together, and if such thicknesses vary beyond reasonable tolerances, then complementary parts of different size have to be used, as a result of which a large stock of parts of different sizes have to be maintained on hand in the field. Further difficulty inherent with prior art devices of this nature is that they are excessively limited, as compared with their size, in their load-carrying ability, both in respect to shear and to tensile loads. Another difficulty in present-day devices of the character indicated, is that they must be invariably reset during engaging operations if tolerances vary even to a microscopic dimension, since in each locking operation the panels have to be brought tightly together, but when the device is open, the panels frequently assume non-parallel relation and necessitate readjustment of the present-day fastener to a greater spread to accommodate it to the deviation of the panels for obtaining initial bite of the fastener and then require re-tightening of the fastener to effect the final clamping of the members, which involves great difficulties and loss of time.

Furthermore, such devices as heretofore available allow separation of the parts fastened together due to the fact that the stud thereof cannot be retained in the nut with sufficeint radial grip, and slight twist of panels or parts causes the stud to move and separate the panels and as a result relative vibration of the parts occurs which finally causes damage to the device or breakage due to crystallization of the metal and consequent disengagement of the fastened panels, which would terminate in tragic results if such device would be used and thus fail on an aircraft.

By utilization of the present invention, the above mentioned and other difficulties are effectively overcome. In general terms, the structure here disclosed comprises in combination with a threaded stud, a hollow receptacle the interior cavity or bore of which is provided with radial channels of generally frusto-conical segmental shape at the faces thereof adjacent to the periphery of the receptacle. The receptacle is secured to one of the panels or other member to be fastened in place. Said receptacle contains jaws in said channels, said jaws being threaded where facing the axis of the receptacle and where facing the periphery of the receptacle have surfaces of generally frusto-conical segmental shape agreeable to and to engage the aforementioned frusto-conical segmental faces of the channels. A spring presses the jaws toward the smaller end of the frusto-conical channel shape, thereby contracting the jaws radially toward the axis to a smaller pitch diameter of threads on the jaws than provided for for the corresponding threads of the stud, and consequently upon insertion of the stud the spring functions to generate a prevailing torque effective on the stud.

The interior or cavity of the receptacle is formed with lands that extend longitudinally of the cavity and project radially inwardly toward the axis thereof and not only provide the sides of said channels, but lands on opposite sides of the axis have their inwardly directed faces parallel to the axis and spaced from each other substantially a distance equal to the major diameter of the stud threads so as to form a guide for the stud. The stud threads and the cooperating jaw threads are specially formed to provide greater slope on one facet than the other to enable the jaw threads to function in the nature of ratchets with the stud threads, thereby enabling the stud to be initially introduced into the jaws, the threads of which are of smaller pitch diameter than the stud threads, and then by simply pressing inwardly on the stud head the jaws are moved axially upwardly and radially outwardly on the frusto-conical segmental surfaces in opposition to the spring pressure, thus providing space for entry of the stud. The stud may thus be pushed into the receptacle acting as a ratchet retained slide as it passes inwardly between the jaws until the panels come into close proximity one to another, and then by twisting the stud clockwise on the threads of the jaws, the jaws move slightly downwardly, bringing the panels into close engagement, and further clockwise rotation of the stud will insure positive locking by generating great radial force on the stud. After the stud threads once engage, no matter how far home they may be pusher or screwed, the constant prevailing torque to prevent unintentional retraction of the stud will be provided by pressure from the coil spring. Pressure of the coil spring is applied to the upper ends of the jaws through the agency of a pressure-distributing washer beneath the spring and engaging the upper ends of said jaws. The lands between the jaws provide parallel side faces defining the widths of the channels as the same width as the jaws permitting the jaws to slide both longitudinally and radially of the axis, but confining the jaws from moving in a direction circumferentially of the receptacle. In other words, the jaws cannot rotate in the receptacle. The lands constitute inwardly directed projections within the receptacle cavity and are formed as integral parts of the receptacle.

Referring now to the specific embodiment of the invention illustrated in said drawings, and giving attention more especially to the showing thereof in FIGURES 1 to 7 inclusive, the reference numerals 20, 21 designate two members, such as panels, adapted to be juxtaposed and clamped together by the fastening device of the present invention. These members are representative of any number and thickness of bodies to be clamped together, and for distinguishing purposes member 20 will be arbitrarily designated as the inner member, and the other will likewise be arbitrarily designated the outer member 21. Said members have holes 22, 23 therein adapted to register axially, both of said holes being shown to appropriately receive, in the ultimate assembly, a stud 24 more fully described hereinbelow, insertable through both of said holes, the head 25 being shown as tapered and seating in a corresponding taper of hole 23.

The fastening device also includes a receptacle 26 suitably mounted on the inner member 20 to have coaxial relationship to the stud in the ultimate assembly and therefore coaxial with hole 22 in the member 20 on which it is mounted. For the sake of simplicity of illustration, said receptacle is shown herein as fixed on the inner member by means of rivets 27 through a flange 27' conveniently provided as an integral part of the receptacle, at what is here termed the bottom of the receptacle, but other suitable mounting of the receptacle may be employed.

Figure 2:
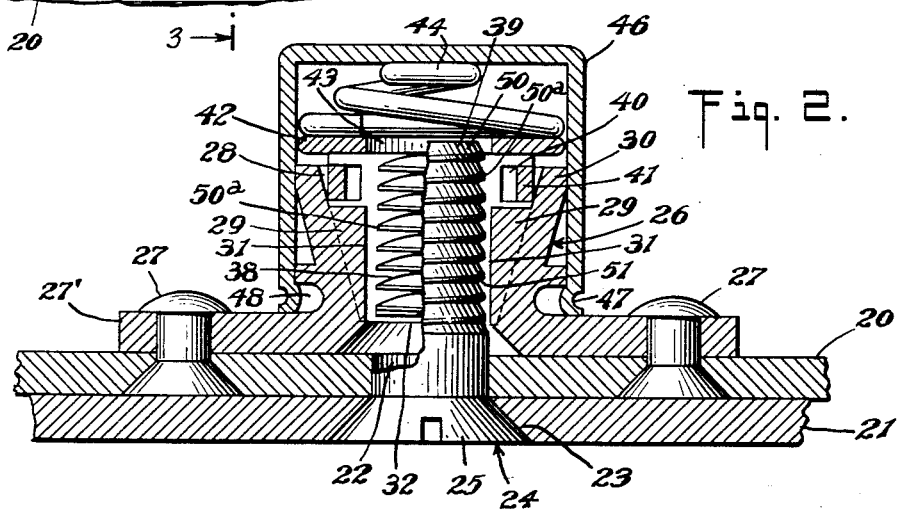
Figure 3:
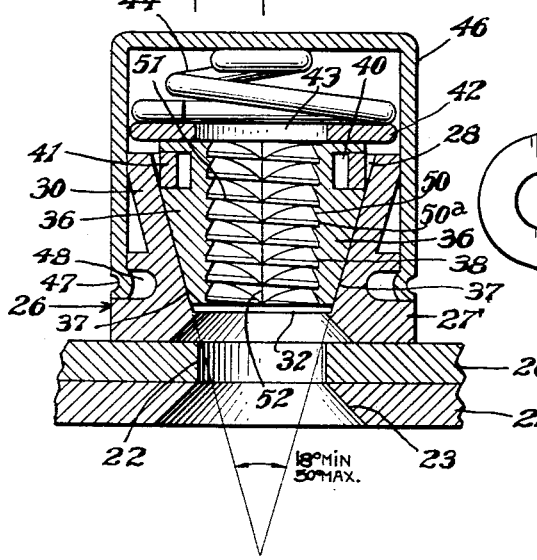
Figure 4:
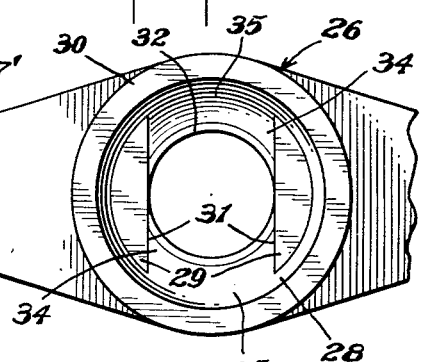
FIGURE 4 is a plan of the receptacle constituting the fixed part of the fastening device when used.
Figure 7A:
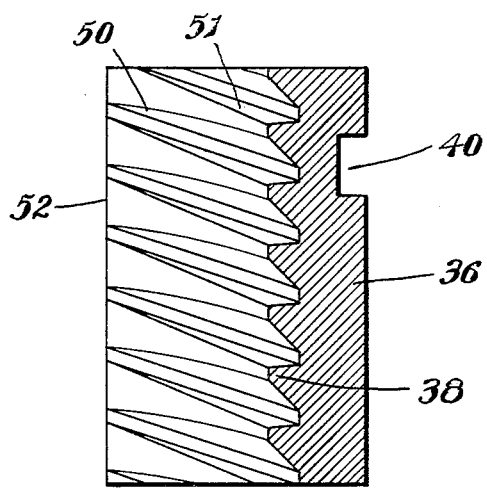
FIGURE 7A is a sectional view on line 7a—7a of FIG. 5.

Receptacle 26 is a hollow body, thereby providing an internal cavity 28, said cavity being of generally frusto-conical shape but with that general frusto-conical shape interrupted by lands 29 formed as integral portions of the body and projecting from the peripheral wall 30 inwardly of the cavity toward the axis of the receptacle and with the inward faces 31 of said lands extending longitudinally of the receptacle parallel to said axis. In FIGURES 2, 3 and 4 two such lands 29 are shown and the inward faces 31 thereof are flat and parallel to each other. As evidenced by FIGURES 2 and 4 especially, the distance between the said inward faces 31 of the lands is substantially equal to the maximum thread diameter of the stud 24 with the said faces having medial portions coincident with or tangential to the opening 32 at the bottom of the smaller end of the fruso-conical cavity 28. This arrangement is conducive to keeping the stud from wobbling when introduced into the cavity. It may also be here observed that the top surfaces of the lands are in a common plane perpendicular to the axis and at a level somewhat below the top edge of the receptacle. By virtue of the construction described, the cavity 28 provides channels 34 diametrically opposed on opposite sides of the axis, the side walls of the channels being parallel and constituted in this embodiment by portions of the said inward faces 31 of the lands 29, the outer or back walls 35 of the channels being segments of the frusto-conical inner face of peripheral wall 30 of the receptacle 26.

Located at least in part in each of said channels 34 is a movable jaw 36 having a width commensurate with the width of the channel so as to be capable of sliding up and down and in and out with respect to the axis, but with adequate fit within said channel so as not to be free to move in a rotary direction around said axis. The edge or face 37 of said jaw which is directed radially outwardly is of segmental frusto-conical shape corresponding to the shape of the back wall 35 of the channel and therefore will slide readily in contact with said back wall. In view, however, of the sloping character of said back wall and of said radially outward face of the jaw, contact sliding of the jaw longitudinally against said wall will cause the jaw to also have a component of movement in a radial direction and that is the only transverse movement of the jaw that is permitted by its mounting in the channel. By keeping the outward face 37 of the jaw always in contact with the back wall 35 of the channel, a transverse movement of the jaw will of necessity be accompanied by a corresponding longitudinal movement of the jaw, and vice versa. For example, if the jaw is forced outwardly it also has to move upwardly, or if forced upwardly it has to also move outwardly. The included angle between the opposite back walls of the channels is within the range of 18° to 50° and of course whatever angle is selected within that range for said back walls 35 of the channels 34 is likewise selected for the included angle between the remote outer faces 37 of the two jaws in opposed channels.

The inwardly directed face of each jaw is of generally segmentally cylindrical character and is provided with screw threads 38 the full length thereof to be engaged by like screw threads 39 on the stud 24. In order that the screw threads of one jaw will appropriately register with the screw threads of the other jaw, means are provided to coordinate sliding movement of both jaws. For this purpose, next to other upper ends of said jaws, considered assembled to constitute a nut unit, is a peripheral groove 40, and in this groove is an endless ring 41 having the same axial dimension as the groove. However, radially the groove is cut deep enough to permit the ring to slide in a radial direction in one jaw far enough to permit assembly of the other jaw through the ring. As the ring operates below the level of the top edge of the receptacle it cannot escape from the groove in the assembled device. The ring affords ample latitude for the jaws to slide radially toward and away from each other, but ties the jaws together in their axial relation and necessitates that both jaws shall move simultaneously longitudinally. Attention may be here called to the fact that when the jaws are in their lowermost position in the channels, as exists in the showing of FIG. 3, the upper ends of said jaws are above the upper level of the top edge of the receptacle, and also that the lower edge of ring 41 is at or above the level of the top surfaces of the lands 29 so as to permit full contraction of said jaws toward each other.

Overlying the upper ends of jaws 36 and above the level of the top of the receptacle 26 is a transversely disposed pressure-distributing washer 42 the central hole 43 of which is large enough to permit entry of the stud 24 as may be seen in FIG. 2, without interference therewith. Above said washer 42 is a spiral cone spring 44 which is maintained under compression by bearing at its upper smaller end against the under side of cap 46 thereover, said cap depending at the sides of said receptacle to which it is suitably secured as by swaging a peripheral bead 47 into a prepared annular recess 48 in the outer surface of the receptacle. The cap 46 not only applies the compression to the spring 44, but keeps it centrally located and also keeps the washer 42 centrally located, and protects the several mechanisms from injury or from extraneous interference to the intended functioning thereof.

While it has been stated above that the jaws 36 are screw threaded at 38 to cooperate and constitute a nut adapted to be screwed on and off of the threads 39 of stud 24, the invention also contemplates a construction by which the stud may be slid inwardly of the jaws across the threads of the jaws approximately to its inward position of use without having to rotate the stud, and when it reaches that position it may then be rotated and pulled tight by screw operation. In other words, the jaws 36 are constructed and arranged to function as a ratchet engagement for the initial range of insertion of the stud, and function as a threaded nut for the final clamping operation. This accordingly supplies the desired quick-fastening feature of the invention. In this connection, it is now appropriate to point out, as shown in FIGURE 5, that the threads 38 of each jaw are crescent-shaped, the major diameter having a radius A and the minor diameter having a radius B. Said radii A and B are substantially equal to each other and to the radius of the major diameter of the stud thread 39, but the centers of radii A and B are off-set or eccentric to each other in appropriate direction for obtaining the resultant crescent shape of the threads. Provision of threads of this shape for the jaws provides an arcuate contour for the inwardly directed peaks or ridges of the threads which will conform to the like contour of the major diameter peaks of threads 39 of the stud and thus avoid damage to the stud threads by the sliding thereof across the threads of the jaws since the minor diameter peaks of the jaw threads will have the same curvature as the engaged major diameter peaks of the stud threads and consequently there will be no projecting corners at the ends of the jaw threads 38 that can dig into the stud threads 39, and will therefore allow the stud to slide inwardly without any difficulty.

The threads 38 of the jaws 36 and threads 39 of the stud 24 are specially shaped as to angular disposition of the facets thereof to the axis. For identification purposes, one facet of each thread will be referred to as the insertion facet 50 and includes a primary portion having a relatively long inward upward taper toward the axis permitting sliding insertion of the stud into the jaws, whereas the other facet for convenience designated the retention facet 51 is within a critical range of 90° to 120° to the axis so as to prevent retraction of the stud except by an unscrewing actuation thereof. Otherwise defined, the primary portion of the insertion facets have materially greater length from peak to valley than the retention facets, and the primary portion of the insertion facets have closer approach to parallelism to the axis than to perpendiculars to the axis, whereas the retention facets have short lengths from peak to valley and are perpendicular to or nearly perpendicular to the axis. The arbitrary angularities selected for illustration in the drawings, show the retention facets at the preferred angle of 90° to the axis, and show the primary portions of the insertion facets as having an acute angle of 25° to the axis within the critical range of 15° to 45° to the axis.

In conjunction with the long taper of the primary portion of the insertion facet described above, the said insertion facet provides a peak 50ª which merges with the primary portion and is of cylindrical configuration where it meets with the next following retention facet. Otherwise expressed, and viewed in longitudinal section of the stud or jaws, the peak of the thread is flattened and because of the slope of the primary portion of the insertion facet that facet is comprised of a primary sloping portion that merges with a flattened peak, the result of which is avoidance of an acute angle where the insertion facet meets with the retention facet, the angle thereat being, instead, substantially a right angle. This construction of insertion facet not only accomplishes a more ready sliding of the stud threads past the jaw threads, but also avoids chipping of the peaks of the threads in use. Consequently the threads will maintain their major diameters without erosion in use, will remain the size formed in manufacture, and will permanently maintain their maximum strength. It should be clearly understood that the description just given of the threads including insertion facets with primary portions and flattened peaks, and retention facets at different angular disposition from the angularity of the insertion facets applies both to the jaw threads and to the stud threads.

It should be noted that in the construction above described, utilizing one pair of jaws in opposite channels, that the jaws have facing edges 52 next to the sides thereof and that those edges of opposite jaws can and will meet when the jaws slide to the smaller ends of the channels, said edges thereby functioning as stops limiting the size of thread opening between the jaws. The said edges or stops are arranged to permit the pitch diameter of the jaw threads, at most contracted relation of the jaws, to be less than the pitch diameter of the stud threads and yet with the jaw threads retained sufficiently open for the stud insertion facets to engage the insertion facets of the jaw threads upon introduction of the stud into the receptacle, and thereby enable the stud to enter between the jaws.

The construction as above described enables clamping of members 20, 21 to be effected very readily in the following manner. The head 25 of the stud 24 is pressed in a direction axially of the stud and receptacle upon initial insertion of the threaded end of the stud into the open end of the receptacle, and will thereby cause the end thread of the stud to push against the most proximate threads of the jaws 36 in an endeavor to mesh therewith. Due to the pressure of spring 44 on the jaws sliding them to their lowermost position in the receptacle, the pitch diameter of the jaw threads 38 is initially then less than the pitch diameter of the stud threads 39, so the operation of pushing the stud upwardly causes the jaws to both move axially upwardly and radially outwardly under impetus of sliding engagement of the insertion facets 50 of the stud and jaws. The cone spring 44 tends to return the jaws downwardly and as said jaws are in sliding engagement with the segmental frusto-conical back walls 35 of the channels 34 in which they are mounted, the retention facets 51 of the jaws will snap into engagement under the retention facets of the stud threads immediately upon registration therewith. This ratcheting action of the jaws is repeated for each registering thread convolution as the stud is pushed inwardly. It will be understood that at any stage of insertion of the stud after engagement with the first thread of the jaws, that the stud may be screwed inwardly of the jaw if desired. Ordinarily, however, the stud will be pushed quickly to its approximate innermost position and will then be rotated clockwise by a tool, such as a screw driver, to tighten it in place. By so tightening the stud, the jaws are caused to forcefully engage the segmental frusto-conical back walls 35 of the channels 34 and apply an outward radial moment of force against the receptacle and an equal and opposite radial force inwardly against the stud in addition to the axial moments of force between the stud and receptacle. These forces not only clamp the members 20, 21 tightly, but also lock the stud against backward or releasing rotation. It will also be recognized that the action of spring 44 constantly pressing upon the jaws, in conjunction with the sloping back walls 35 of the channels 34 and sloping outward faces 37 of the jaws, will generate a prevailing torque of jaw and stud engagement at all locations of the stud within the jaws, and even if a stud is not screwed fully home, the prevailing torque will keep it from unintended unscrewing. To release the device from its clamping condition, the stud may be rotated anticlockwise, as by use of a screw driver, and entirely retracted by fully unscrewing it from the jaws. The jaws automatically return, due to the applied spring pressure, to their most contracted initial position ready for again receiving the stud.

Considering now the modified construction of FIGURES 8 to 15 inclusive, the receptacle 53 there shown is, as with above-described receptacle 26, a hollow body providing an internal cavity 54 of generally frusto-conical shape, and of course is applicable to clamp members, which for simplicity have not been again shown. A cap 46 described in connection with FIGURES 1–3 will also be used in the same manner on the receptacle 53 of FIGURES 8–11.

The frusto-conical shape of said cavity 54 is interrupted by lands 55 formed as integral portions of the body and projecting from the peripheral wall 56 of the receptacle inwardly of the cavity toward the axis. It may also be here observed that the top surfaces of the lands are in a common plane perpendicular to the axis and at a level somewhat below the top edge of the receptacle. In this modified construction, four lands are shown and the inward faces thereof toward the axis are parallel to the axis and spaced radially therefrom a distance substantially equivalent to the radius of stud 24, thus, as with the previously described receptacle, providing means conducive to keeping the stud from wobbling.

Channels 57 are provided between the several lands, the channels being aligned as opposite pairs and at right angles of one pair to the other around the axis. The side walls of the channels are parallel to each other and are constituted by the side walls of the lands. The outer or back wall 58 of the channels are segments of the frusto- conical inner face of peripheral wall 56 of the receptacle.

Located at least in part in each of said channels 57 is a movable jaw 59 having a width commensurate with the width of the channel so as to be capable of sliding up and down and in and out with respect to the axis, but with adequate fit within said channel so as not to be free to move in a rotary direction around the axis. The edge or face 60 of said jaw which is directed radially outwardly is of segmental frusto-conical shape corresponding to the shape of the back wall 58 of the channel and therefore will slide readily in contact with said back wall. In view, however, of the sloping character of said back wall and of said radially outwardly directed face of the jaw, contact sliding of the jaw longitudinally against said back wall will cause the jaw to also have a component of movement in a radial direction. By keeping the outward face 60 of the jaw always in contact with the back wall 58 of the channel, a transverse movement of the jaw will of necessity be accompanied by a corresponding longitudinal movement of the jaw, and vice versa. The included angle between the opposite back walls 58 of the aligned channels is within the range of 18° to 50° and of course whatever angle is selected within that range for said back walls of the channels is likewise selected for the included angle between the remote outer faces 60 of the jaws.

The inwardly directed face of each jaw is of generally segmentally cylindrical character and is provided with screw threads 61 the full length thereof to be engaged by like screw threads 39 on the stud 24. In order that the screw threads of one jaw will appropriately align with the screw threads on a next adjacent jaw, means are provided to coordinate sliding movement of the several jaws. This includes the previously described provision of a peripherally disposed groove 40 in part in each jaw, and an endless ring 41 therein having the same axial dimension as the groove but slidable diametrically in the groove for introduction into the groove and for operational purposes.

It is also necessary in this modified construction that means be provided for limiting inward approach of the pair of jaws in opposite channels. Such a means is provided in conjunction with a pressure-distributing washer 62 which has a downwardly directed annular rib 63 next to its central hole 64. Each jaw has an upwardly projecting riser 65 next to its outer top edge adapted to engage said rib 63 and thereby functioning as stops limiting the size of threaded opening between the jaws. The said stops are arranged to permit the pitch diameter of the jaw threads, at most contracted relation of the jaws, to be less than the pitch diameter of the stud threads and yet with the jaw threads retained sufficiently open for the stud insertion facets to engage the insertion facets of the jaw threads upon introduction of the stud into the receptacle, and to thereby enable the stud to enter between the jaws. The thread facets of the modified construction may be the same as for the first-described construction and repetition of description thereof is not deemed necessary. However, as actually shown, the threads of this modified construction of FIGS. 13–15 are likewise illustrated as somewhat modified from the showing in preceding views.

Here, the threads are of a more shallow nature and resemble more closely conventional V-threads. Thus, the retention facets, instead of being perpendicular to the axis are at an angle of approximately 30°. Also the primary portions of the insertion facets are at a corresponding angle of approximately 30° to the axis. Agreeable to the previously described threads, these modified threads of FIGS. 13–15, are flattened at their peaks to provide cylindrical peaks 50$^b$ for the insertion facets. In this instance, however, viewed in cross-section, the sloping primary portions of the insertion facets merge with the cylindrical peaks thereof on a radius R the center of which is theoretically on a line bi-secting the angle between the retention facet and primary portion of the insertion facet. Consequently the insertion facets in this showing includes a primary sloping portion, a radius portion, and a cylindrical peak portion. By virtue of this construction, the stud threads, similarly formed, will readily slide past the primary insertion portions of the jaw threads and the retention facets will lodge against each other to prevent unintentional withdrawal. The insertion facets of the jaws and the insertion facets of the stud both therefore include sloping primary portions, radius portions, and cylindrical portions and the retention facets of both jaw and stud are straight uninterrupted surfaces. The threads thus formed will maintain their major diameters without erosion in use, will remain the size to which they were formed in manufacture, and will permanently maintain their maximum strength.

Likewise the presence and functioning of the spring 44 is in accordance with the previous description, and it therefore follows that prevailing torque will be present. Understanding of operation readily follows for the showing of FIGS. 8–15 from the above lengthy description of operation of the structure of FIGS. 1–7. Finally I wish to have it understood that though I have arbitrarily selected certain embodiments and structures and have shown certain number of channels and jaws and specific relationship of channels to each other, these may be varied in numerous ways within the scope of the appended claims.

I claim:
1. A fastening device of the quick-locking type comprising a receptacle having a cavity therethrough and a threaded stud insertable through said cavity, said cavity having lands therein projecting toward the axis of said receptacle and extending longitudinally thereof, said lands having channels of progressively varying depth therebetween and said channels having side walls in planes chordal to said cavity and having rear walls longitudinally of and in said receptacle and sloping toward the axis thereof, a jaw in each of said channels in guided engagement with said side wall thereof, each said jaw having a rear face conforming to the shape of the rear wall of the channel and slidable thereagainst for thereby varying protrusion of the jaw from its channel toward the axis, said jaws having threads toward said axis adapted to receive said threaded stud, and a washer overlying and in contact with said jaws retaining said jaws axially parallel in the varying positions of protrusion thereof, said washer having an annular rib projecting toward said jaws, and said jaws having a riser for engagement with said rib.

2. A fastening device of the quick-locking type comprising a receptacle having a cavity therethrough and a threaded stud insertable through said cavity, said cavity having lands therein projecting toward the axis of said receptacle and extending longitudinally thereof, said lands having channels therebetween and said channels having side walls in planes chordal to said cavity and having rear walls in and longitudinal of said receptacle and sloping toward the axis thereof, a jaw in each of said channels in guided engagement with said side walls thereof, each said jaw having a rear face conforming to the shape of the rear wall of the channel and slidable thereagainst for thereby varying protrusion of the jaw from its channel toward the axis to closely associated relation of the jaws to each other, said jaws having threads toward said axis adapted to receive said threaded stud, said threads of the jaws being crescent shape, and means for retaining said jaws at a common level with each other for meshing said crescent shaped threads of the several jaws with the threaded stud, said means comprising corresponding grooves in the several jaws and a tie ring mounted in said grooves, said tie ring having a greater inner diameter than the inner diameter of said groove of the closely assembled jaws thereby establishing a limited range of free radial path of movement for each of said jaws.

3. A fastening device of the quick-locking type, comprising a receptacle having a cavity therethrough and a threaded stud insertable through said cavity, said cavity having at least three lands therein projecting toward the axis of said receptacle and extending longitudinally thereof, said lands having side walls in planes chordal to said cavity and pairs of said walls being parallel to each other providing channels therebetween and there being at least three of said channels, said channels having rear walls in said receptacle sloping toward the axis thereof, a jaw in each of said channels slidable both radially and longitudinally between a respective pair of said parallel walls, each said jaw having a rear face conforming to the shape of the rear wall of the channel in which located and slidable longitudinally against said rear wall for thereby effecting radial sliding of the jaws for varying protrusion of the jaw from its channel toward the axis, said jaw having threads projecting toward said axis and threaded stud therein, and means common to all of said jaws movable as a unit effective on all of the jaws and movable with the jaws as the jaws slide longitudinally and located in the path of radial movement of said jaws thereby limiting radial movement and location of the jaws symmetrical to the axis, said jaws having a limited freedom of radial movement from closely associated relation to and until intercepted by said means in the path of radial movement of said jaws.

4. A fastening device of the quick-locking type comprising a receptacle having a cavity therethrough and a threaded stud insertable through said cavity, said cavity having lands therein projecting toward the axis of said receptacle and extending longitudinally thereof, said lands having side walls in planes chordal to said cavity and pairs of walls being parallel to each other providing channels therebetween, said channels having rear walls in said receptacle sloping toward the axis thereof, a jaw in each of said channels slidable both radially and longitudinally between a respective pair of said parallel walls, each said jaw having a rear face conforming to the shape of the rear wall of the channel in which located and slidable longitudinally against said rear wall for thereby effecting radial sliding of the jaws for varying protrusion of the jaw from its channel toward the axis, said jaw having threads projecting toward said axis and threaded stud therein, restricting means common to all of said jaws movable as a unit with all of the jaws as the jaws slide longitudinally and located in the path of radially inward movement of said jaws thereby limiting radially inward jaw movement for providing a specific size of threaded opening between said jaws at their innermost radial location for admitting the stud therebetween, said restricting means in its entirety having internal relation to the outside rear faces of the jaws whereby said jaws are movable freely in a longitudinal direction against said rear walls without hinderance by the said restricting means, and a synchronizing annulus on which said jaws are mounted for retaining said jaws joined for simultaneous and equal longitudinal movement, said jaws being radially movable with respect to said synchronizing annulus outwardly to a limiting position thereon, said jaws being limited in radial outward movement on said annulus only at a position of maximum outward departure from their common axis and freely movable on said annulus at all other positions thereon.

5. A fastening device of the quick-locking type comprising a receptacle having a cavity therethrough, said cavity having a pair of opposite lands therein projecting toward the axis of said receptacle and extending longitudinally thereof, said lands having a pair of channels therebetween and each of said channels having parallel side walls of progressively varying depth in planes chordal to said cavity, said planes being parallel to said axis, each said channel having a rear wall the full width between the respective side walls thereof and sloping longitudinally toward said axis, a jaw equal in width to and in each of said channels with side faces of the jaw in guided engagement with said side walls of the respective channel in which located, each said jaw having a rear face the full width between said side faces and conforming to the shape of the rear wall of the channel and slidable thereagainst for thereby varying protrusion of the jaw from its channel toward the axis, and said jaws having chordal front edges of which the front edges of one jaw are adapted to engage the front edges of the other jaw, said jaws having crescent threads providing peaks and valleys with the ends of the crescent threads of each jaw terminating at the respective said front edges in a common plane and the maximum distance perpendicular to said common plane of each jaw from the valleys of the threads of the respective jaw to the said common plane thereof being less than the radius of the jaw thread valleys.

6. A fastening device of the quick-locking type comprising a receptacle having a cavity therethrough and a threaded stud insertable through said cavity, the opening at one end of said cavity being smaller than the other end opening thereof, said cavity having lands projecting toward the axis of said receptacle and extending longitudinally thereof, said lands having side walls in planes chordal to said cavity and providing wall portions parallel to the axis and spaced from each other a distance corresponding to the diameter of the smaller opening of the cavity and constituting guiding means for the stud to deter wobbling thereof, and pairs of said walls being parallel to each other providing channels therebetween, said channels having rear walls of segmental curved shape in said receptacle and sloping toward said axis, and a jaw in each of said channels slidable between a respective pair of said parallel walls, each said jaw having a rear face conforming to the shape of the rear wall of the channel in which located and slidable against said rear wall for thereby varying protrusion of the jaw from its channel toward the axis to closely associated relation of the jaws to each other, each said jaw having threads of crescent shape projecting toward said axis and threaded stud, both arcs of the crescent being less than a semi-circle and both arcs having a radii at least as great as the radius of the major diameter of the stud threads, the crescent threads of one jaw being constituted as continuations of the crescent threads of the next adjacent jaw and said jaws having rigid encircling means controlling simultaneous radial and longitudinal movement outwardly and axially from said closely associated relation with a limited range of free radial path of movement for said jaws of equal extent from said axis, said controlling means maintaining said jaws equally disposed in longitudinal movement in axial direction.

7. A fastening device of the quick-locking type comprising a receptacle and a threaded stud insertable into said receptacle on a common axis therewith, movable jaws in said receptacle adapted to be closely associated, said jaws having threads directed inwardly toward said axis for receiving said threaded stud, said threads of each jaw having variable depth in a radial direction at progressively different portions of the length thereof, and encircling means radially loose on and holding said jaws in parallelism and controlling simultaneous movement of the jaws both radially and longitudinally with a limited freedom of radial movement of said jaws and maintaining said jaws equally disposed in relation to said axis, said means retaining said threads of one jaw in position of continuation of the threads of the adjacent jaw both before and after insertion of said threaded stud, said variable depth of said jaw threads providing areas of maximum and minimum engagement of the jaw threads with the stud threads, said maximum areas being located at equally spaced intervals around said stud thereby providing balanced support and distributed cumulative prevailing torque for said stud, and said minimum areas promoting ready insertion of said stud through said jaws, 8. A fastening device of the quick-locking type comprising a receptacle and a threaded stud insertable into said receptacle on a common axis therewith, two directly opposite movable jaws in said receptacle with longitudinal facing flat edges adapted to be closely assembled, said jaws having threads extending between and to said edges and directed inwardly toward said axis for receiving said threaded stud, said threads of each jaw being less than semi-circular in length and having variable depth in a radial direction progressively of the length of the thread with the maximum depth of said threads providing areas medially between the ends of the threads and between said edges of the jaw and the minimum depth providing minimum areas of engagement of the jaw threads with the stud threads next to the sides of said jaws, said maximum areas being opposite each other and providing balanced support and distributed cumulative prevailing torque by all of said maximum areas opposed to said stud, and said minimum areas promoting ready insertion of said stud through said jaws.

9. A fastening device in accordance with claim 8, wherein interengaging sloping surfaces on the receptacle and jaws and rigid encircling means around the jaws are provided controlling simultaneous movement of the jaws both radially and longitudinally with a limited freedom of radial movement of said jaws and maintaining said jaws equally disposed during longitudinal movement in axial direction, this last mentioned means retaining the minimum areas of one jaw in position of continuation of the minimum area of the threads of the adjacent jaw before and after insertion of said threaded stud and maintaining parallelism of the axes of the jaw threads.

References Cited in the file of this patent

UNITED STATES PATENTS

| | | |
|---|---|---|
| 209,486 | Luther | Oct. 29, 1887 |
| 1,404,296 | Howard | Jan. 24, 1922 |
| 1,475,907 | Volman | Nov. 27, 1923 |
| 1,498,040 | Johnson | June 17, 1924 |
| 1,523,463 | Thompson | Jan. 20, 1925 |
| 1,879,421 | Nalle | Sept. 27, 1932 |
| 2,294,745 | Goetz | Sept. 1, 1942 |
| 2,300,228 | Kinney | Oct. 27, 1942 |
| 2,549,939 | Shaw | Apr. 24, 1951 |
| 2,576,579 | Donovan | Nov. 27, 1951 |
| 2,874,877 | Spencer | Feb. 24, 1959 |

FOREIGN PATENTS

| | | |
|---|---|---|
| 624,714 | Great Britain | June 15, 1949 |
| 628,316 | Great Britain | Aug. 26, 1949 |